United States Patent [19]
Davis et al.

[11] Patent Number: 5,512,118
[45] Date of Patent: Apr. 30, 1996

[54] METHOD OF COVERING ROOFS WITH ROOFTOP CURABLE HEAT SEAMABLE ROOF SHEETING

[75] Inventors: James A. Davis, Uniontown; Joseph K. Valaitis, Brecksville, both of Ohio

[73] Assignee: Bridgestone/Firestone, Inc., Akron, Ohio

[21] Appl. No.: 320,871

[22] Filed: Oct. 11, 1994

Related U.S. Application Data

[60] Continuation of Ser. No. 93,348, Jul. 16, 1993, abandoned, which is a division of Ser. No. 690,453, Apr. 24, 1991, Pat. No. 5,242,970.

[51] Int. Cl.$^6$ .............................. B29C 65/02; B32B 31/04
[52] U.S. Cl. ...................... 156/157; 52/746.11; 156/71; 428/57
[58] Field of Search .................... 156/71, 157, 307.1, 156/308.4; 52/746, 408, 746.11; 428/57, 141, 147, 149; 524/492–495, 576, 580–581

[56] References Cited

U.S. PATENT DOCUMENTS

| | | |
|---|---|---|
| 3,280,082 | 10/1966 | Natta et al. . |
| 3,650,874 | 3/1972 | Job et al. . |
| 3,660,530 | 5/1972 | Hoblit et al. . |
| 3,801,531 | 4/1974 | Berejka et al. . |
| 3,867,247 | 2/1975 | O'Farrell et al. . |
| 3,887,530 | 6/1975 | O'Farrell et al. . |
| 3,919,358 | 11/1975 | Batiuk et al. . |
| 3,941,859 | 3/1976 | Batiuk et al. . |
| 4,036,912 | 7/1977 | Stricharczuk . |
| 4,130,535 | 12/1978 | Coran et al. . |
| 4,210,579 | 7/1980 | Grigo et al. . |
| 4,212,787 | 7/1980 | Matsuda et al. . |
| 4,220,579 | 9/1980 | Rinehart . |
| 4,229,504 | 10/1980 | Brachman . |
| 4,247,661 | 1/1981 | Herman et al. . |
| 4,263,186 | 4/1981 | Blüemel . |
| 4,355,139 | 10/1982 | Coran et al. . |
| 4,435,466 | 3/1984 | Kuhnel et al. . |
| 4,438,228 | 3/1984 | Schenck . |
| 4,480,012 | 10/1984 | Fieldhouse . |
| 4,480,065 | 10/1984 | Kawai et al. . |
| 4,514,442 | 4/1985 | Crepeau ............................ 136/71 X |
| 4,537,825 | 8/1985 | Yardley . |
| 4,563,379 | 1/1986 | Krüger ............................. 428/57 X |
| 4,601,935 | 7/1986 | Metcalf et al. . |
| 4,652,328 | 3/1987 | Bischoff et al. ................ 156/308.4 X |
| 4,680,071 | 7/1987 | Candle ........................... 156/157 X |
| 4,687,810 | 8/1987 | Coran . |
| 4,732,925 | 3/1988 | Davis . |
| 4,742,119 | 5/1988 | Close . |
| 4,767,658 | 8/1988 | Lorenz . |
| 4,778,852 | 10/1988 | Futamura . |
| 4,801,639 | 1/1989 | Hoshi et al. . |
| 4,803,020 | 2/1989 | Valaitis et al. . |
| 4,833,194 | 5/1989 | Kuan et al. . |
| 4,839,412 | 6/1989 | Harrell et al. . |
| 4,845,145 | 7/1989 | Hazelton et al. . |
| 4,851,463 | 7/1989 | Opsahl et al. . |
| 4,855,362 | 8/1989 | Muse, Jr. et al. . |
| 4,894,408 | 1/1990 | Hazelton et al. . |
| 4,912,148 | 3/1990 | Kim et al. . |
| 4,918,127 | 4/1990 | Adur et al. . |
| 4,985,502 | 1/1991 | Izumi et al. . |
| 5,070,111 | 12/1991 | Dumbauld . |
| 5,086,121 | 2/1992 | Hazelton et al. ...................... 525/197 |
| 5,093,206 | 3/1992 | Schoenbeck ..................... 428/141 X |
| 5,256,228 | 10/1993 | Davis et al. ........................ 156/71 X |
| 5,286,798 | 2/1994 | Davis et al. ..................... 524/495 X |
| 5,370,755 | 12/1994 | Davis et al. ............................ 156/71 |

FOREIGN PATENT DOCUMENTS

| | | | |
|---|---|---|---|
| 1230077 | 4/1971 | United Kingdom .................... 156/71 |

OTHER PUBLICATIONS

*Rubber Technology and Manufacture* by Blow, (1971); Butterworths, London, pp. 172–173.
"Rubber–Thermoplastic Compositions. Part V. Selecting Polymers for Thermoplastic Vulcanizates" by Coran et al., *Rubber Chemistry and Technology*, vol. 55, (1981) pp. 116–136.
*Vulcanization and Vulcanizing Agents*, Werner Hoffmann: Palmerton Publishing Co. Inc., New York, NY, 1967, pp. 30–31, 76–78, 114–119, 138–147.

*Primary Examiner*—Adrienne C. Johnstone
*Attorney, Agent, or Firm*—Frank J. Troy, Sr.

[57] ABSTRACT

A rooftop curable heat seamable sheet material for roofing prepared from an uncured polymeric composition of matter comprises 100 parts by weight of a semi-crystalline polymer having more than about 2 percent by weight crystallinity and selected from the group consisting of polyolefins prepared from monomers containing at least 2 carbon atoms from about 20 to 300 parts by weight of a filler selected from the group consisting of reinforcing and non-reinforcing materials and mixtures thereof per 100 parts of polymer; from about 20 to 150 parts by weight of a processing material and mixtures thereof, per 100 parts of polymer; and from about 1.5 to 10 parts by weight of a cure package capable of allowing the composition of matter to cure at temperatures of at least about 50° C. A method for covering a roof is also provided and comprises the steps of applying layers of rooftop curable sheet material prepared from an uncured heat seamable polymeric composition of matter to the roof being covered; overlapping adjacent edges of the layers; and seaming the overlapping areas under sufficient heat and some pressure to provide acceptable seam strength, the composition of matter being curable at temperatures of at least about 50° C., a temperature readily encountered on the roof of a building.

10 Claims, No Drawings

METHOD OF COVERING ROOFS WITH ROOFTOP CURABLE HEAT SEAMABLE ROOF SHEETING

This application is a continuation of application Ser. No. 08/093,348, filed Jul. 16, 1993, now abandoned, which is a divisional of application Ser. No. 07/690,453, filed Apr. 24, 1991, now U.S. Pat. No. 5,242,970.

TECHNICAL FIELD

The present invention relates generally to sheeting material used for roofing. More particularly the sheeting material is comprised of ethylene-propylene-diene terpolymer, referred to herein as EPDM, ethylene-propylene rubber, referred to herein as EPR, ethylene-butene copolymer, ethylene-octene copolymer or similar olefinic type polymer, and mixtures thereof. The roof sheeting material of the present invention is curable at relatively low temperatures of between 50° C. and 70° C. and is thus, rooftop curable, thereby effecting the cost of labor and energy to cure the material. Moreover, being rooftop curable, it is not necessary to cure the material prior to installation which otherwise effects a significant decrease in tack, necessitating the use of adhesives along the seams. A method is also provided for covering roofs which includes the step of employing a rooftop curable sheeting material of the present invention.

BACKGROUND OF THE INVENTION

Polymeric roof sheeting is used as single ply roofing membrane for covering industrial and commercial flat roofs. Such membranes are generally applied to the roof surface in vulcanized or cured state. As noted hereinabove, energy is expended during the cure and it is likely that an adhesive will be required to join adjacent seams of the material during installation.

Because of outstanding weathering resistance and flexibility, cured EPDM based roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation curing and sulfur curing, a disadvantage of utilizing these elastomers is not only the lack of adhesion of EPDM, especially cured EPDM, to itself but also the fact that the elastomer must be separately cured at some stage. The former is a serious problem because in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured EPDM sheets together. An adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both the short term and long term stresses such as those discussed hereinabove. Moreover, the adhesive must be resistant to oxidation, hydrolysis and chemical attach from ponded water. Additionally, the adhesive must provide the important property often referred to in the adhesive art as "Quick Stick". The term "Quick Stick" means the characteristics of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two to about seven days at room temperature (i.e. 22° C.) to attain maximum adhesive strength. At higher ambient temperature, this time period may be somewhat less but at minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two to seven days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives have not proven to be very satisfactory due to their lower than desirable peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous. Finally, elimination of the need to cure the sheeting material at all would be a significant advantage over the use of known materials.

SUMMARY OF THE INVENTION

It is thus an object of the present invention to provide rooftop curable heat seamable EPDM and EPR roof sheeting materials that need not be separately subjected to cure prior to or subsequent to installation.

It is another object of the present invention to provide rooftop curable heat seamable EPDM and EPR roof sheeting materials which will show cure progressing at temperatures readily obtainable on a black roofing membrane exposed to sunlight in most climates.

It is still another object of the present invention to provide rooftop curable heat seamable EPDM and EPR roof sheeting materials which will show progressive increases in modulus and tensile strength at temperatures as low as 50° C.

It is yet object of the present invention to provide rooftop curable heat seamable EPDM and EPR roof sheeting materials which can be made to cure more rapidly or more slowly with minor compounding modifications.

It is still another object of the present invention to provide a method for covering roofs which employs rooftop curable heat seamable EPDM, EPR or other olefin type polymers as roof sheeting materials which do not require separate curing treatment prior to or subsequent to installation.

In general the present invention relates to a rooftop curable heat seamable sheet material for roofing prepared from an uncured polymeric composition of matter comprising 100 parts by weight of a semi-crystalline polymer having more than about 2 percent by weight crystallinity and selected from the group consisting of polyolefins prepared from monomers containing at least 2 carbon atoms from about 20 to 300 parts by weight of a filler selected from the group consisting of reinforcing and non-reinforcing materials and mixtures thereof per 100 parts of polymer; from about 20 to 150 parts by weight of a processing material and mixtures thereof, per 100 parts of polymer; and from about 1.5 to 10 parts by weight of a cure package capable of allowing the composition of matter to cure at temperatures of at least about 50° C.

A method for covering a roof is also provided and comprises the steps of applying layers of rooftop curable sheet material prepared from an uncured heat seamable polymeric composition of matter to the roof being covered; overlapping adjacent edges of the layers; and seaming the overlapping areas under sufficient heat and pressure to provide acceptable seam strength, the composition of matter being curable at temperatures of at least about 50° C.

At least one or more of the foregoing objects, together with the advantages thereof over the use of known rooftop sheeting materials, which shall become apparent to those skilled in the art, are described in greater detail with reference to the specification which follows.

REFERRED EMBODIMENT OF THE INVENTION

As noted hereinabove, the roof sheeting materials of the present invention comprise EPDM, EPR or other similar olefin type polymers. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082 the disclosure of which is incorporated herein by reference. The preferred polymers having from about 60 to about 95 weight percent ethylene and from about zero to about 12 weight percent of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon® MD-744 (Exxon Chemical Co.) a terpolymer having a Mooney Viscosity (ML/4 at 125° C.) of about 52; an ethylene/propylene (E/P) ratio of 61/39 weight percent and 2.7 weight percent of unsaturation.

Particularly useful and preferred EPDM materials include Royalene® 375 (Uniroyal Chemical Co.); and EPsyn® 5508 (Copolymer Rubber & Chemical Corporation). Royalene 375 has a Mooney Viscosity (ML/4 at 125° C.) of about 50.8; an E/P ratio of 75/25 weight percent and about 2.0 weight percent of unsaturation (dicyclopentadiene). EPsyn® 5508 has a Mooney Viscosity (ML/4 at 125° C.) of about 55.6; and E/P ratio of 73/27 weight percent and about 3.7 weight percent of unsaturation. An experimental polymer, EPsyn® DE-249 having a Mooney Viscosity (ML/4 at 125° C.) of about 56.1; an E/P ratio of 71/29 weight percent and about 1.7 weight percent of unsaturation (5-ethylidene-2-norbornene) was also employed.

The term EPR is used in the sense of its definition as found in ASTM D-1418-85 and is intended to mean a copolymer of ethylene and propylene. The preferred copolymers contain from about 60 to 95 weight percent ethylene with the balance to total 100 weight percent being propylene. A typical EPR is Vistalon® 719 (Exxon Chemical Co.) having an E/P ratio of about 75/25 weight percent.

To be useful as a roofing material in the present invention it is necessary that the EPDM have at least about 2 weight percent crystallinity, from the ethylene component; an $\overline{M}n$ as measured by GPC of at least about 30,000 and an $\overline{M}w$, as measured by GPC of at least about 100,000 (for example, about 190,000 for Royalene® 375 and about 333,000 for EPsyn® DE-249). Similarly, the EPR should have at least about 2 weight percent crystallinity (ethylene); an $\overline{M}n$, as measured by GPC of at least about 30,000 and an $\overline{M}w$, as measured by GPC of at least about 100,000. We have found that the selection of an EPDM or EPR having high crystallinity (at least 2 percent by weight) and a weight average molecular weight of at least 100,000 is necessary to provide a roofing material which does not require curing prior to application, if ever, and which does not require any type of adhesive, solvent-based or the like, to join and seam the spliced edges.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having an $\overline{M}w$, as measured by GPC of at least about 221,000. Other similar olefinic polymers (e.g., ethylene/octene copolymer) can be used to practice this invention. Generally speaking any semi-crystalline polymer having more than about 2 percent by weight crystallinity and selected from the group consisting of polyolefins prepared from monomers containing at least 2 carbon atoms can be employed. The preferred semi-crystalline polymer may have up to about 3.7 weight percent unsaturation. For purposes of discussion herein, references to EPDM, EPR or similar olefinic polymers is intended to include any of the semi-crystalline polymers of the present invention.

The composition or compound employed to form the roof sheeting material comprises 100 parts by weight of EPDM, EPR, or other similar olefinic type copolymers, including mixtures of two or more types, to which is added basically fillers, and processing materials, a special cure package and optionally, other components all of which are discussed hereinbelow.

With respect first to the filler, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Generally, preferred fillers include carbon black, ground coal and cryogenically ground rubber.

Carbon black is used in an amount of about 20 parts to about 300 parts per 100 parts of polymer (phr), preferably in an amount of about 60 to about 150 phr. The preferred range of carbon black herein (60 to 150 phr) is about equal to the amount of carbon black normally used in preparing sulfur cured EPDM roof sheeting. In one embodiment the carbon black is used in an amount of about 120 phr and in another embodiment about 130 phr. The carbon black useful herein is any carbon black. Preferred are furnace blacks such as GPF (general purpose furnace), FEF (fast extrusion furnace) and SRF (semi-reinforcing furnace). These carbon blacks may also be blended with more reinforcing blacks, i.e., HAF, ISAF, SAF and the like. For a complete description of such carbon blacks, see for example, *The Vanderbilt Rubber Handbook*, pp 408–424, RT Vanderbilt Co., Norwalk Conn. 06855 (1979).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65 phr with about 15 to 35 phr being preferred.

Finally, essentially any cryogenically ground rubber may be employed as a filler in the composition of the invention. The preferred cryogenically ground rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts thereof fall within the range of amounts normally employed in preparing sulfur cured conventional roof sheeting.

With respect to the processing material, it is included to improve the processing behavior of the composition (i.e. reduce mixing time and increase rate of sheet forming and includes processing oils, waxes and the like). The processing oil is included in an amount ranging from about 20 parts to about 150 parts process oil per 100 parts EPDM or EPR, preferably in an amount ranging from about 60 parts to about 100 phr, and in one embodiment about 75 phr and in another embodiment about 90 phr. A preferred processing oil is a paraffinic oil, e.g. Sunpar 2280 which is available front the Sun Oil Company. Other petroleum derived oils including naphthenic oils may be used.

Regarding the cure package, sulfur or sulfur vulcanizing agents or mixtures thereof employed in the rooftop curable membrane composition may range from about 1.5 phr to as high as 10 phr by weight with the preferred amounts ranging from about 1.5 to about 6 phr. Sulfur is employed in amounts of about 0.25 to 2 phr. In addition, the cure package provides one or more vulcanizing accelerators including thioureas such as ethylene thiourea; N,N-dibutylthiourea; N,N-diethylthiourea and the like; thiuram monosulfides and disulfides such as tetramethylthiuram monosulfide (TMTMS); tetrabutylthiuram disulfide (TBTMS); tetramethylthiuram disulfide (TMTDS); tetraethylthiuram monosulfide (TETDS); and the like; benzothiazole sulfenamides such as N-oxydiethylene-2-benzothiazole sulfenamide; N-cyclohexyl-2-benzothiazole sulfenamide; N,N-diisopropyl-2-benzothiazole sulfenamide; N-tert-butyl-2-benzothiazole sulfenamide and the like; 2-mercaptoimidazoline; N,N-diphenyl-guanadine; N,N-di-(2-methylphenyl)guanadine; 2-mercaptobenzothiazole; 2-(morpholinodithio)-benzothiazole disulfide; zinc 2-mercaptobenzothiazole and the like; dithiocarbamates such as tellurium diethyldithiocarbamate; copper dimethyldithiocarbamate; bismuth dimethyldithiocarbamate; cadmium diethyldithiocarbamate; lead dimethyldithiocarbamate; zinc diethyldithiocarbamate and zinc dimethyldithiocarbamate.

It should be appreciated that the foregoing list is not exclusive, and that other vulcanizing agents known in the art to be effective in the curing of EPDM terpolymers may also be utilized. For a list of additional vulcanizing agents, see *The Vanderbilt Rubber Handbook*, referenced hereinabove.

Amounts of the various components that can be employed in the cure package are set forth in Table I hereinbelow which provides both broad and preferred ranges for each type of component, when present. Again, the total amount of the cure package employed ranges between about 1.5 and 10 phr, depending upon the amount of sulfur, the vulcanizing accelerators selected and the ultimate destination or use of the EPDM composition. That is, when employed as a rooftop curable sheet membrane in a warm climate, different accelerators and/or amounts thereof will be selected than where the sheet membrane is to be installed in a cooler climate. The amounts of sulfur and vulcanizing accelerators employed in the composition are based on parts per hundred rubber by weight.

TABLE I

Cure Package Components

| Ingredients | Broad Range, phr | Preferred Range, phr |
| --- | --- | --- |
| Sulfur | 0.25–2.0 | 0.5–1.5 |
| Thiuram accelerators | | |
| TMTMS | 0.5–4 | 1–2 |
| TMTDS | 0.5–3.5 | 1–2 |
| TETDS | 0.75–3.5 | 1–2.5 |
| Thiazole accelerators | | |
| Captax - MBT | 0.25–3 | 0.35–2 |
| Altax - MBTS | 0.25–3 | 0.35–2.5 |
| Sulfenamide accelerators | | |
| N-cyclohexyl-2-benzothiazole sulfenamide | 0.5–3.5 | 1–2.5 |
| N-tert-butyl-2-benzothiazole sulfenamide | 0.5–3.5 | 1–2.5 |
| Dithiocarbamate accelerators | | |
| Copper dimethyldithiocarbamate | 0.5–3.0 | 1–2.5 |
| Dimethylcyclohexyl-ammonium dibutyl dithiocarbamate | 0.5–2.75 | 1–2.5 |
| Tellurium diethyldithiocarbamate | 0.5–2.5 | 1–2 |

Preferably, the cure package includes from about 1 to 4 phr of at least one thiuram accelerator, from about 0.25 to 2 phr of a thiazole accelerator, and from about 1 to 2.5 phr of a sulfenamide accelerator. Even more preferably, the cure package may include from 0.5 to 1 phr of a thiazole accelerator and from 1 to 2 phr of a sulfenamide accelerator.

It is to be understood that the cure package comprises sulfur and at least one or more of the foregoing accelerators and thus, the amounts presented in Table I are those wherein one or more of the above accelerators are present. As noted hereinabove, the roof sheeting compound is not cured prior to application and needed not be cured subsequent thereto. The presence of the cure package allows the sheet material to cure at temperatures of at least about 50° C., for example in the range of from about 50° C. to about 69° C., or from about 50° C. to 69° C., readily obtainable when exposed to sunlight in most climates.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150 phr, and conventional amounts of other rubber compounding additives, such as zinc oxide, stearic acid, antioxidants, antiozonants, flame retardants, and the like.

The compounding ingredients can be admixed, utilizing an internal mixer (such as a Banbury mixer), an extruder, and/or a two-roll mill, or other mixers suitable for forming a viscous relatively uniform admixture. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is sheeted to thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single-ply" roofing membranes used commercially. The sheeting can be cut to desired length and width dimensions at this time.

The method of the present invention is practiced by utilizing an EPDM or EPR sheet material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention. Generally, seam overlap ranges from about a minimum of one inch to as wide as four to six inches. Scrim reinforcement of the rooftop curable heat seamable sheet is optional.

Assuming an overlap of several inches, the next step is to apply heat and some pressure to the edge area to form the seam. Heat in the form of hot air can be applied to the seam using either a hand-held heating gun or a mobile hot air automatic welding machine, commonly referred to as a heat welding robot. Both of these devices offer a number of different heat (hot air) settings. Numerous techniques which utilize pressure can be used to produce an effective seam as are known to those skilled in the art. Pressure can vary widely from a minimum of about 3 psi up to about 60 psi, typically so long as it is adequate to provide an acceptable seam strength.

In order to practice the present invention, several EPDM compounds were prepared and subjected to both peel and shear adhesion tests, as will now be set forth in detail. The EPDM polymers selected included Royalene® 375; and an experimental EPDM terpolymer EPsyn® DE-249 and characterization of the polymers is presented in Table II hereinbelow.

TABLE II

Polymer Characterization Study

| | Royalene® 375 | EPsyn® DE-249 |
| --- | --- | --- |
| ML/4 at 125° C. | 51 | 56.1 |
| Ethylene Content, wt % | 76 | 71 |
| Crystallinity, wt % | 14.6 | 9.3 |
| Tg, °C. (by DSC) | −50.6 | −47.5 |
| Tm, °C. (by DSC) | 49.3 | 38.3 |
| Unsaturation, % | 2.0 | 1.7 |
| 2of unsaturation | DCPD[a] | ENB[b] |
| $\bar{M}n$ | 69,500 | 106,000 |
| $\bar{M}w$ | 190,300 | 332,900 |
| $\bar{M}n/\bar{M}w$ ratio | 2.85 | 3.14 |

[a]dicyclopentadiene
[b]5-ethylidene-2-norbornene

The polymers in Table II, differ from other commercially available EPDM's (i.e., Royalene® 3180, Royalene® 2859, Vistalon® 2200, etc.), in that, they are highly crystalline, high ethylene containing polymers. However, many of the other polymer properties listed above are similar to most of the commercially available EPDM terpolymers.

The following examples provide five rooftop curable EPDM roofing membranes and are submitted for the purpose of further illustrating the nature of the present invention and are not to be considered as a limitation on the scope thereof. Parts shown in the examples are by weight for the rubber hydrocarbon with all other parts being per hundred parts of rubber hydrocarbon (phr) by weight.

TABLE III

Rooftop Curable Heat Seamable Black EPDM Membranes

| Compound No. | 1 | 2 | 3 | 4 | 5 |
|---|---|---|---|---|---|
| Royalene ® 375 | 100 | 60 | 75 | 75 | — |
| EPsyn ® DE-249 | — | — | — | — | 100 |
| Dowlex ® 2027 | — | 40 | — | — | — |
| LDPE-132 | — | — | 25 | — | — |
| HDPE-12065 | — | — | — | 25 | — |
| HiStr GPF black, phr | 120 | 125 | 125 | 125 | 130 |
| Sunpar 2280 oil, phr | 75 | 85 | 85 | 85 | 90 |
| Sulfur, phr | 1.25 | 1.0 | 1.1 | 1.1 | 1.25 |
| TMTDS, phr[a] | 1.0 | 0.75 | 0.80 | 0.75 | 1.0 |
| Captax-MBT, phr[b] | 0.35 | 0.30 | 0.30 | 0.30 | 0.35 |
| Santocure NS, phr[c] | 1 | 0.75 | 0.75 | 0.75 | 1.0 |
| Sulfads, phr[d] | 0.60 | 0.50 | 0.50 | 0.50 | 0.60 |
| Total | 299.20 | 313.30 | 313.45 | 313.40 | 324.20 |

[a]TMTDS: Tetramethylthiuram disulfide
[b]Captax - MBT: 2-Mercaptobenzothiazole
[c]Santocure NS: N-tert-butyl-2-benzothiazole sulfenamide (TBBS)
[d]Sulfads: Dipentamethylene thiuram hexasulfide (DPTH)

In the examples illustrated in Table III, Compound No. 1 was prepared with 100 parts by weight of Royalene® 375; Compound No. 5 was prepared with 100 parts by weight of the experimental terpolymer, EPsyn® DE-249 and Compounds 2–4 were prepared with mixtures of Royalene 375® and other thermoplastic polymers, as noted in the above Table. Each of the compound examples were prepared utilizing standard rubber mixing techniques and equipment by mixing together the ingredients listed hereinabove.

In order to evaluate the seamability of these sheet materials of the present invention, both peel and shear adhesion results were determined and reported in the tables appearing hereinbelow. These include: peel adhesion and seam shear strength; tensile properties over increasing periods of time and, crescent tear. The procedure employed for the peel and shear adhesion tests conducted was as follows:

DETAILED PEEL AND SHEAR ADHESION TEST PROCEDURE

Each of the above rubber compounds was subjected to adhesion testing which necessitated the building of test pads comprising 6×6 inch sheets reinforced by using a fabric reinforcement, according to the following procedure:

1. A 10×20-inch two roll mill was utilized to prepare a number of 6×6-inch sheets of rubber approximately 40 mils in thickness for building adhesion test pads.
2. In order to reinforce the uncured sheets of rubber, a 6×6-inch sheet of PVC treated polyester scrim (10×10 epi cord construction) was inserted between two 6×6-inch sheets of rubber.
3. The rubber-scrim assembly was covered with a layer of a Mylar film and placed in the cavity of a metal curing mold (6×6×0.075-inch).
4. The rubber-scrim assembly was then pressed in a Mylar film for about five minutes at about 149° C.
5. Two of the 6×6-inch scrim reinforced rubber pads were seamed together using a hand-held heating gun (Leister). Approximately 15 to 18 pounds force was applied by means of a roller such as a standard two-inch wide metal roller. Satisfactory seams (either peel or shear) could be formed using only 3 to 4 pounds force and the standard two-inch wide metal roller. The seams were allowed to equilibrate for 24 hours before testing.
6. A clicker machine with a one-inch wide die was utilized to prepare a number of test specimens for seam peel (Type B, 90° peel) and shear (Type A, 180° peel) adhesion testing.
7. Testing machine: Model 1130 Instron® Universal Tester—a testing machine of the constant rate-of-jaw separation type. The machine was equipped with suitable grips capable of clamping the specimens firmly and without slippage throughout the tests.
8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.
9. Adhesion strength is defined as: peel adhesion strength (lbs/inch)=pounds force×sample width; shear adhesion strength (lbs/square inch)=pounds force×sample width.

Unaged peel adhesion and shear adhesion tests were conducted, utilizing the test pads discussed hereinabove, and are reported in Tables IV and V. Crosshead and chart speeds for all adhesion tests were conducted at the rate of two inches per minute (ipm). Stress-strain properties were measure at weekly intervals for a period of eleven consecutive weeks on 45 mil flat rubber sheets subjected to 50° C. oven aging (Table VI) and 70° C. oven aging (Table VII).

TABLE IV

Rooftop Curable Heat Seamable Black EPDM Membranes - Peel Adhesion Strength Adhesion Studies

| Compound No. | 1 | 2 | 3 | 4 | 5 |
|---|---|---|---|---|---|
| Peel Adhesion at 23° C. - Unaged specimens | | | | | |
| Lbs./inch | 48 | 49 | 24.5 | 52.5 | 56 |
| Failure type | (A) | (A,B) | (A) | (A,B) | (A,B) |
| Peel Adhesion at 70° C. - test specimens preheated 15 minutes prior to testing | | | | | |
| Lbs./inch | >3.8 | >11.6 | >3.4 | >3 | >2.9 |
| Failure type | (B) | (B) | (B) | (B) | (B) |

(A) = Weld Failure
(B) = Very slight tearing at the interface, followed by rubber tearing to the fabric reinforcement and eventually rubber separating from the fabric reinforcement Peel adhesion as shown in Table IV for Compounds 1–5, and seam shear strength in Table V for Compounds 1–5 were substantially reduced when the one-inch wide test samples were tested at elevated temperatures. In Table IV, exceptionally high shear adhesion results were obtained at both 23° C. and 70° C. by replacing 40 parts of Royalene 375 with Dowlex 2027, a copolymer of ethylene and octene. Type of test specimen failure was essentially the same for all five compounds.

For further testing purposes, three rings were cut from dusted 45 mil flat sheets, prepared from Compounds 1–5, that had been hanging in a forced air oven at either 50° or 70° C. From both the unaged (controls) and aged samples, standard ring specimens were cut according to ASTM D-412 (Method B—Cut Ring Specimens removed from flat sheets). The ring specimens were prepared from flat sheets not less than 1.0 mm nor more than 3.0 mm in thickness and of a size that would permit cutting the ring specimen. Modulus and tensile strength at break and elongation at break measurements were obtained using a table model Instron® tester, Model 1130, and the test results were calculated in accordance with ASTM D-412. All ring specimens were allowed to set for 24 hours, following which testing was carried out at 23° C.

TABLE V

Rooftop Curable Heat Seamable Black EPDM Membranes - Seam Shear Strength Adhesion Studies

| Compound No. | 1 | 2 | 3 | 4 | 5 |
|---|---|---|---|---|---|
| Seam Shear Strength at 23° C. - Unaged specimens | | | | | |
| Lbs./inch$^2$ | >65 | >116.5 | >78 | >73.5 | >65 |
| Failure type | (C) | (C) | (C) | (C) | (C) |
| Seam Shear Strength at 70° C. - test specimens preheated 15 minutes prior to testing | | | | | |
| Lbs./inch$^2$ | >27.5 | >51.5 | 34 | 31 | 27.5 |
| Failure type | (C) | (C) | (A,C) | (A,C) | (A,C) |

(A) = Weld Failure
(C) = Necking/Breaking - rubber test strip elongated and broke adjacent to the weld seam

TABLE VI

Rooftop Curable, Heat Seamable Black EPDM Membranes - 50° C. Oven Aging Study

| Compound No. | 1 | 2 | 3 | 4 | 5 |
|---|---|---|---|---|---|
| Stress-Strain Properties at 23° C. | | | | | |
| Unaged Controls | | | | | |
| 100% Modulus, psi | 300 | 375 | 430 | — | 235 |
| 300% Modulus, psi | 510 | 525 | — | — | 475 |
| Tensile at break, psi | 690 | 630 | 520 | 450 | 620 |
| Elongation at break, % | 515 | 395 | 165 | 75 | 450 |
| Aged 7 Days at 50° C. | | | | | |
| 100% Modulus, psi | 350 | 410 | 465 | — | 265 |
| 300% Modulus, psi | 710 | 665 | — | — | 585 |
| Tensile at break, psi | 845 | 720 | 530 | 475 | 730 |
| Elongation at break, % | 450 | 365 | 150 | 70 | 455 |
| Aged 14 Days at 50° C. | | | | | |
| 100% Modulus, psi | 365 | 435 | 505 | — | 290 |
| 300% Modulus, psi | 730 | 725 | — | — | 625 |
| Tensile at break, psi | 885 | 780 | 565 | 535 | 800 |
| Elongation at break, % | 440 | 360 | 140 | 60 | 470 |
| Aged 21 Days at 50° C. | | | | | |
| 100% Modulus, psi | 380 | 450 | 535 | — | 310 |
| 300% Modulus, psi | 765 | 760 | — | — | 690 |
| Tensile at break, psi | 910 | 815 | 585 | 560 | 815 |
| Elongation at break, % | 435 | 350 | 135 | 55 | 420 |
| Aged 28 Days at 50° C. | | | | | |
| 100% Modulus, psi | 385 | 455 | 570 | — | 330 |
| 300% Modulus, psi | 830 | 780 | — | — | 715 |
| Tensile at break, psi | 925 | 805 | 605 | 615 | 825 |
| Elongation at break, % | 395 | 340 | 130 | 50 | 415 |
| Aged 35 Days at 50° C. | | | | | |
| 100% Modulus, psi | 405 | 470 | 585 | — | 350 |
| 300% Modulus, psi | 835 | 805 | — | — | 725 |
| Tensile at break, psi | 925 | 825 | 625 | 630 | 835 |
| Elongation at break, % | 380 | 320 | 125 | 55 | 405 |
| Aged 42 Days at 50° C. | | | | | |
| 100% Modulus, psi | 410 | 490 | 605 | — | 370 |
| 300% Modulus, psi | 860 | 820 | — | — | 760 |
| Tensile at break, psi | 940 | 835 | 620 | 610 | 855 |
| Elongation at break, % | 375 | 310 | 115 | 45 | 400 |
| Aged 49 Days at 50° C. | | | | | |
| 100% Modulus, psi | 415 | 500 | 635 | — | 380 |
| 300% Modulus, psi | 875 | — | — | — | 780 |
| Tensile at break, psi | 955 | 820 | 645 | 595 | 870 |
| Elongation at break, % | 370 | 295 | 120 | 45 | 390 |
| Aged 56 Days at 50° C. | | | | | |
| 100% Modulus, psi | 425 | 510 | 650 | — | 390 |
| 300% Modulus, psi | 900 | — | — | — | 795 |
| Tensile at break, psi | 965 | 830 | 660 | 615 | 880 |
| Elongation at break, % | 355 | 290 | 110 | 40 | 390 |
| Aged 63 Days at 50° C. | | | | | |
| 100% Modulus, psi | 415 | 525 | — | — | 395 |
| 300% Modulus, psi | 915 | — | — | — | 800 |
| Tensile at break, psi | 970 | 840 | 690 | 645 | 825 |
| Elongation at break, % | 350 | 285 | 90 | 35 | 370 |
| Aged 70 Days at 50° C. | | | | | |
| 100% Modulus, psi | 410 | 555 | — | — | 400 |
| 300% Modulus, psi | 925 | — | — | — | 810 |
| Tensile at break, psi | 985 | 845 | 725 | 655 | 895 |
| Elongation at break, % | 350 | 275 | 80 | 35 | 365 |
| Aged 77 Days at 50° C. | | | | | |
| 100% Modulus, psi | 420 | 575 | — | — | 410 |
| 300% Modulus, psi | 925 | — | — | — | 820 |
| Tensile at break, psi | 990 | 865 | 745 | 670 | 905 |
| Elongation at break, % | 345 | 265 | 75 | 35 | 360 |

TABLE VII

Rooftop Curable, Heat Seamable Black EPDM Membranes - 70° C. Oven Aging Study

| Compound No. | 1 | 2 | 3 | 4 | 5 |
|---|---|---|---|---|---|
| Stress-Strain Properties at 23° C. | | | | | |
| Unaged Controls | | | | | |
| 100% Modulus, psi | 300 | 375 | 430 | — | 235 |
| 300% Modulus, psi | 510 | 525 | — | — | 475 |
| Tensile at break, psi | 690 | 630 | 520 | 450 | 620 |
| Elongation at break, % | 515 | 395 | 165 | 75 | 450 |
| Aged 7 Days at 70° C. | | | | | |
| 100% Modulus, psi | 345 | 430 | 505 | — | 285 |
| 300% Modulus, psi | 735 | 715 | — | — | 645 |
| Tensile at break, psi | 885 | 840 | 600 | 485 | 785 |
| Elongation at break, % | 435 | 410 | 175 | 70 | 440 |
| Aged 14 Days at 70° C. | | | | | |
| 100% Modulus, psi | 375 | 460 | 525 | — | 305 |
| 300% Modulus, psi | 775 | 745 | — | — | 670 |
| Tensile at break, psi | 915 | 865 | 615 | 525 | 795 |
| Elongation at break, % | 415 | 405 | 165 | 70 | 420 |
| Aged 21 Days at 70° C. | | | | | |
| 100% Modulus, psi | 395 | 485 | 550 | — | 625 |
| 300% Modulus, psi | 815 | 785 | — | — | 685 |
| Tensile at break, psi | 935 | 885 | 630 | 545 | 815 |
| Elongation at break, % | 405 | 395 | 160 | 65 | 420 |

TABLE VII-continued

Rooftop Curable, Heat Seamable Black EPDM Membranes - 70° C. Oven Aging Study

| Compound No. | 1 | 2 | 3 | 4 | 5 |
|---|---|---|---|---|---|
| Aged 28 Days at 70° C. | | | | | |
| 100% Modulus, psi | 425 | 510 | 575 | — | 335 |
| 300% Modulus, psi | 835 | 805 | — | — | 740 |
| Tensile at break, psi | 945 | 880 | 645 | 580 | 835 |
| Elongation at break, % | 400 | 385 | 155 | 60 | 395 |
| Aged 35 Days at 70° C. | | | | | |
| 100% Modulus, psi | 445 | 525 | 605 | — | 360 |
| 300% Modulus, psi | 865 | 835 | — | — | 770 |
| Tensile at break, psi | 980 | 895 | 640 | 610 | 860 |
| Elongation at break, % | 395 | 355 | 140 | 55 | 385 |
| Aged 42 Days at 70° C. | | | | | |
| 100% Modulus, psi | 460 | 550 | 630 | — | 385 |
| 300% Modulus, psi | 905 | 885 | — | — | 815 |
| Tensile at break, psi | 980 | 930 | 670 | 630 | 895 |
| Elongation at break, % | 370 | 340 | 120 | 45 | 365 |
| Aged 49 Days at 70° C. | | | | | |
| 100% Modulus, psi | 485 | 580 | 665 | — | 410 |
| 300% Modulus, psi | 945 | 935 | — | — | 875 |
| Tensile at break, psi | 1005 | 985 | 695 | 665 | 920 |
| Elongation at break, % | 340 | 325 | 110 | 40 | 330 |
| Aged 56 Days at 70° C. | | | | | |
| 100% Modulus, psi | 515 | 595 | — | — | 435 |
| 300% Modulus, psi | 995 | 985 | — | — | 925 |
| Tensile at break, psi | 1050 | 1015 | 735 | 685 | 955 |
| Elongation at break, % | 335 | 315 | 95 | 35 | 315 |
| Aged 63 Days at 70° C. | | | | | |
| 100% Modulus, psi | 510 | 600 | — | — | 430 |
| 300% Modulus, psi | 1000 | — | — | — | 920 |
| Tensile at break, psi | 1045 | 1005 | 725 | 690 | 950 |
| Elongation at break, % | 330 | 295 | 85 | 35 | 320 |
| Aged 70 Days at 70° C. | | | | | |
| 100% Modulus, psi | 515 | 610 | — | — | 435 |
| 300% Modulus, psi | 1020 | — | — | — | 925 |
| Tensile at break, psi | 1065 | 1025 | 755 | 705 | 960 |
| Elongation at break, % | 325 | 285 | 75 | 35 | 615 |
| Aged 77 Days at 70° C. | | | | | |
| 100% Modulus, psi | 525 | 635 | — | — | 445 |
| 300% Modulus, psi | 1025 | — | — | — | 940 |
| Tensile at break, psi | 1055 | 1030 | 770 | 720 | 975 |
| Elongation at break, % | 320 | 270 | 70 | 30 | 315 |

As can be determined from the data in Tables VI and VII, physical properties of the specimens increased with time when subjected to 50° and 70° C. oven aging. After eleven weeks of aging, all five membrane compositions showed cure progressing at 50° C., a temperature readily obtainable by a black roofing membrane exposed to sunlight in most climates.

For purposes of comparison, test slabs of Compounds No. 1–5, compression molded for 35 minutes at 149° C., were also subjected to stress-strain testing, the results of which are reported in Table VIII hereinbelow.

TABLE VIII

Rooftop Curable, Heat Seamable Black EPDM Membranes - 70° C. Oven Aging Study

| Compound No. | 1 | 2 | 3 | 4 | 5 |
|---|---|---|---|---|---|
| Stress-Strain Properties at 23° C. | | | | | |
| Test Specimens Cured 35' at 149° C. | | | | | |
| Unaged | | | | | |
| 100% Modulus, psi | 360 | 575 | 440 | 500 | 330 |
| 300% Modulus, psi | 725 | 760 | 730 | 710 | 775 |
| Tensile at break, psi | 785 | 775 | 765 | 760 | 875 |
| Elongation at break, % | 365 | 320 | 335 | 345 | 405 |
| Crescent tear at 23° C. - Die C - | | | | | |
| Test Specimens Cured 35' at 149° C. | | | | | |
| Unaged | | | | | |
| Lbs./inch | 183 | 208 | 169 | 195 | 244 |
|  | 195 | 212 | 182 | 166 | 241 |
| Average | 189 | 210 | 175.5 | 180.5 | 242.5 |

As can be determined from the data presented in Table VIII, physical properties were generally no better than where the membranes had been subjected to oven aging without pre-cure and, after eleven consecutive weeks of aging, the oven aged membranes had improved stress-strain properties over the unaged, compression molded roofing membranes (Compounds 1–5). In other words, the roofing membrane compositions (Compounds 1–5) aged in a forced air oven at either 50° or 70° C. appeared to be fully cured after eleven weeks of aging.

In conclusion, it should be clear from the foregoing examples and specification disclosure that the use of EPDM, EPR or any other olefin type polymers, having high ethylene content, high crystallinity and high molecular weight in compositions having a specific cure package which allows such sheet material to be rooftop curable. After eleven weeks of aging, all five compounds showed good cure development in both 50° and 70° C. forced air ovens, suggesting potential for rooftop curing. Moreover the sheet materials do not require the use of any adhesive for seaming or splicing the overlapping adjacent edges of said sheet materials.

It is to be understood that the invention is not limited to the specific types of EPDM exemplified herein or by the disclosure of other typical EPDM, EPR or other olefin type polymers provided herein, the examples having been provided merely to demonstrate the practice of the subject invention. Those skilled in the art may readily select other EPDM, EPR or other similar olefin polymers including copolymers of ethylene and butene as well as ethylene and octene, according to the disclosure made hereinabove. Similarly, the invention is not necessarily limited to the particular fillers, the curatives or the processing material exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method for covering a roof comprising the steps of:
applying layers of rooftop curable sheet material prepared from an uncured heat seamable polymeric composition of matter to the roof being covered, wherein said composition of matter of each layer consists essentially of 100 parts by weight of a curable semi-crystalline polymer having more than about 2 percent by weight crystallinity and selected from the group consisting of polyolefins prepared from monomers containing at least 2 carbon atoms, said polymer having an ethylene content of at least 60 percent by weight and having up to about 3.7 weight percent unsaturation;

from about 20 to 300 parts by weight of a filler selected from the group consisting of reinforcing and non-reinforcing materials and mixtures thereof, per 100 parts of said polymer;

from about 20 to 150 parts by weight of at least one processing material, per 100 parts of said polymer; and from about 1.5 to 10 parts by weight of a sulfur cure package having at least one vulcanizing accelerator, said cure package capable of allowing said composition of matter to cure at temperatures of from about 50° C. to about 69° C.; overlapping adjacent edges of said layers; and seaming the overlapped areas under sufficient heat and pressure to provide a peel adhesion seam strength at 70° C., when preheated 15 minutes prior to testing, of greater than 2.9 pounds/inch and a seam shear strength at 70° C., when preheated 15 minutes prior to testing, of greater than 27.5 pounds/square inch, said composition of matter being curable at temperatures of from about 50° C. to about 69° C.

2. A method, as set forth in claim 1, wherein said polymer comprises an ethylene-propylene-diene terpolymer having an ethylene content of 76 percent by weight, a weight average molecular weight of about 190,000 and about 14.6 percent by weight crystallinity.

3. A method, as set forth in claim 2, wherein said filler comprises about 120 parts by weight of carbon black and said composition of matter includes about 75 parts by weight of processing oil, per 100 parts of said polymer.

4. A method, as set forth in claim 2, wherein said cure package comprises from about 0.25 to 2 parts by weight of sulfur; from about 1 to 4 parts by weight of at least one thiuram accelerator; from about 0.25 to 2 parts by weight of a thiazole accelerator and, from about 1 to 2.5 parts by weight of a sulfenamide accelerator, per 100 parts by weight of said polymer.

5. A method, as set forth in claim 4, wherein said cure package comprises 1.25 parts by weight of sulfur; 1 part by weight of a thiuram accelerator; 0.5 to 1 parts by weight of a thiazole accelerator and, 1 to 2 parts by weight of a sulfenamide accelerator, per 100 parts by weight of said polymer.

6. A method, as set forth in claim 1, wherein said polymer comprises an ethylene-propylene-diene terpolymer having an ethylene content of 71 percent by weight, a weight average molecular weight of about 333,000 and about 9 percent by weight crystallinity.

7. A method, as set forth in claim 6, wherein said filler comprises about 130 parts by weight of carbon black and said at least one processing material comprises about 90 parts by weight of processing oil, per 100 parts of said polymer.

8. A method, as set forth in claim 6, wherein said cure package comprises from about 0.25 to 2 parts by weight of sulfur; from about 1 to 4 parts by weight of at least one thiuram accelerator; from about 0.25 to 2 parts by weight of a thiazole accelerator; and from about 1 to 2.5 parts by weight of a sulfenamide accelerator, per 100 parts of said polymer.

9. A method, as set forth in claim 8, wherein said cure package comprises 1.25 parts by weight of sulfur, 1 part by weight of a thiuram accelerator; 0.5 to 1 parts by weight of a thiazole accelerator, and 1 to 2 parts by weight of a sulfenamide accelerator, per 100 parts of said polymer.

10. A method for covering a roof comprising the steps of:

applying layers of rooftop curable sheet material prepared from an uncured heat seamable polymeric composition of matter to the roof being covered, wherein said composition of matter of each layer consists essentially of 100 parts by weight of a curable semi-crystalline polymer having more than about 2 percent by weight crystallinity and selected from the group consisting of polyolefins prepared from monomers containing at least 2 carbon atoms, said polymer having an ethylene content of at least 60 percent by weight;

from about 20 to 300 parts by weight of a filler selected from the group consisting of reinforcing and non-reinforcing materials and mixtures thereof, per 100 parts of said polymer;

from about 20 to 150 parts by weight of at least one processing material, per 100 parts of said polymer; and from about 1.5 to 10 parts by weight of a sulfur cure package having at least one vulcanizing accelerator, said cure package capable of allowing said composition of matter to cure at temperatures of from about 50° C. to 69° C.;

overlapping adjacent edges of said layers; and seaming the overlapped areas under sufficient heat and pressure to provide acceptable seam strength, said composition of matter being curable at temperatures of from about 50° C. to 69° C.

* * * * *